July 28, 1953

S. E. HARMON 2,647,171

TELEPHONE SHOULDER REST

Filed May 22, 1950

INVENTOR.
Sydney E. Harmon,
BY Sabin C. Bronson
Atty.

Patented July 28, 1953

2,647,171

UNITED STATES PATENT OFFICE 2,647,171

TELEPHONE SHOULDER REST

Sydney E. Harmon, Evanston, Ill.

Application May 22, 1950, Serial No. 163,338

2 Claims. (Cl. 179—157)

This invention relates to an improved device for holding and supporting a continental receiver-transmitter telephone instrument upon the shoulder of the user, with the receiver portion against the ear and the transmitter portion in proper position to receive voice vibrations.

The principal object of the present invention is to provide a simple and inexpensive device of the character set forth which is readily applicable to a combination receiver-transmitter telephone unit.

The invention is an improvement upon that type of "clamp-on" units such as illustrated in Design Patent No. 150,664, dated August 17, 1948, because with that device, when the receiver-transmitter is in normal position during use, the holder does not extend from the instrument toward the user's shoulder, and therefore to make the device function, the user must tilt the head materially, assuming a very uncomfortable position, conclusive to muscular strain and cramps if continued for any length of time. With the present device, the longer axis of the opening is at an angle to the long axis of the holder so that when applied to the telephone instrument, and the receiver portion placed against the ear, the device extends directly to the shoulder, and therefore no tilting of the head is necessary to hold the device in place, which is another object of the invention.

A further object is to construct the end of the device which rests upon the shoulder of a much softer material than the remainder so as to readily conform to the articulation of the user's shoulder, much like a cushion, which will not cause any discomfort at all during use.

Other objects and advantages of the invention will appear in the following description thereof.

Referring now to the accompanying drawing forming part of this application and wherein like reference characters indicate like parts:

Figure 1:
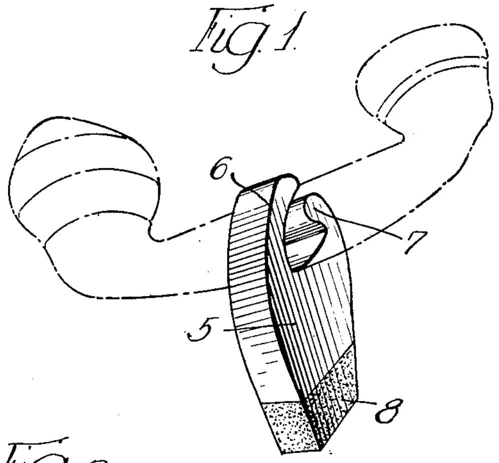
Fig. 1 is a perspective view of one of the holders as it would appear applied to a combination receiver-transmitter telephone unit.
Figure 2:
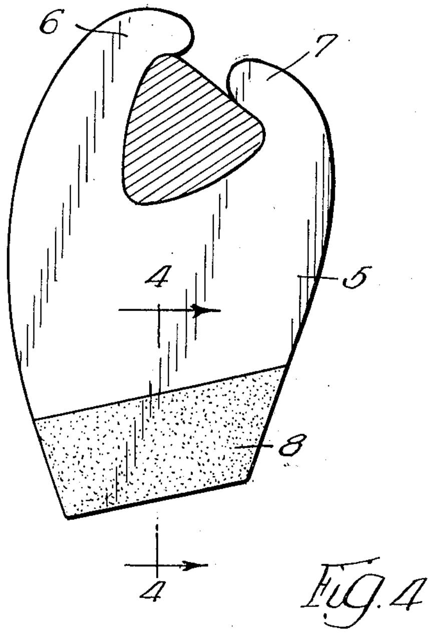
Fig. 2 is a side elevation of the device.
Figure 3:
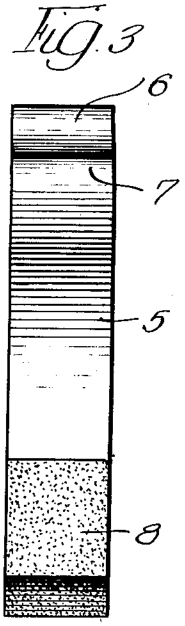
Fig. 3 is an end view.
Figure 4:
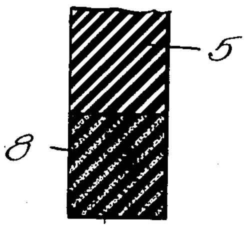
Fig. 4 is a section on line 4—4, Fig. 2.

My improved holder comprises a body portion 5, having curving sides, which terminate at one end in a pair of fingers 6 and 7, which define an opening therebetween of a contour that the telephone receiver-transmitter may be held therein when the fingers 6—7 are slipped thereover. The cross-sectional shape of the telephone instrument is substantially triangular, and said body portion 5 being constructed of resilient material, such as relatively hard rubber, the fingers, due to said resilience, will remain firmly engaged over the instrument. It will be noted, especially in Fig. 2, that the long axis or the opening is at an angle to the long axis of the holder so that when applied to the telephone instrument and in use the holder will extend normally, without tilting the head, to the user's shoulder.

That end of the instrument which rests on the shoulder when in use is formed of relatively soft material such as sponge rubber, and is indicated at 8, and which material has been found in use to be very soft and yielding on the shoulder, conforming very readily to the contour thereof without discomfort.

The shoulder engaging end of portion 8 is substantially flat and inclined to the long axis of the body part 5, which inclination is about parallel to the user's shoulder when in use so that there is no unusual distorting of same during use.

Having thus described my invention, what I claim and desire to secure by Letters Patent, is:

1. A shoulder support for a hand telephone receiver-transmitter set comprising a flat body portion of substantially truncated oval contour having ends in planes converging toward each other, one of said ends being straight, and the other of said ends comprising spaced fingers defining an opening therebetween of substantially triangular shape for receiving the shank of a telephone set, the longitudinal axis of said opening being at an angle to the longitudinal axis of said body portion.

2. A shoulder support for a hand telephone receiver-transmitter set comprising a flat block of substantially truncated oval contour, the ends being in planes converging toward each other whereby one side of the block is shorter than the other, one of said ends being straight, the other end of said block being provided with a substantially triangular opening for receiving the shank of a telephone set, said opening passing completely through the block and opening out through said other end, with the longitudinal axis of the opening being at an angle to the longitudinal axis of the block.

SYDNEY E. HARMON.

References Cited in the file of this patent

UNITED STATES PATENTS

| Number | Name | Date |
|---|---|---|
| 2,243,554 | Epstein | May 27, 1941 |
| 2,521,162 | Harris | Sept. 5, 1950 |